United States Patent
Wu et al.

(10) Patent No.: US 10,628,403 B2
(45) Date of Patent: Apr. 21, 2020

(54) ANNOTATION SYSTEM FOR EXTRACTING ATTRIBUTES FROM ELECTRONIC DATA STRUCTURES

(71) Applicant: ORACLE INTERNATIONAL CORPORATION, Redwood Shores, CA (US)

(72) Inventors: Su-Ming Wu, Waltham, MA (US); Setareh Borjian Boroujeni, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 999 days.

(21) Appl. No.: 15/007,381

(22) Filed: Jan. 27, 2016

(65) Prior Publication Data
US 2017/0212921 A1    Jul. 27, 2017

(51) Int. Cl.
*G06F 16/23* (2019.01)
*G06F 16/24* (2019.01)
(Continued)

(52) U.S. Cl.
CPC ........... *G06F 16/23* (2019.01); *G06F 16/211* (2019.01); *G06F 16/221* (2019.01);
(Continued)

(58) Field of Classification Search
None
See application file for complete search history.

(56) References Cited

U.S. PATENT DOCUMENTS 8,977,953 B1 *  3/2015  Pierre ............... G06F 17/2785
                                                 715/201
9,348,815 B1 *  5/2016  Estes ................ G06F 17/2785
(Continued)

OTHER PUBLICATIONS

Kanani, Pallika, Wick Michael, and P. Adam. "Attribute extraction from noisy text using character-based sequence tagging models." In Machine Learning for eCommerce workshop, NIPS. 2015. (Year: 2015).*

(Continued)

*Primary Examiner* — Alexey Shmatov
*Assistant Examiner* — Casey R. Garner
(74) *Attorney, Agent, or Firm* — Kraguljac Law Group, LLC

(57) ABSTRACT

Systems, methods, and other embodiments associated with extracting attributes from electronic data structures are described. In one embodiment, a method includes correlating tokens from description strings with defined attributes in an electronic inventory database by identifying which of the defined attributes match the tokens to link the tokens with columns of the database associated with the defined attributes. The method includes iteratively updating annotation strings for unidentified ones of the tokens by generating suggested matches for the unidentified tokens according to known correlations between identified tokens and the defined attributes using a conditional random fields model. The method also includes populating the database using the identified tokens from the description strings according to the annotation strings by automatically storing the tokens from the description strings into the columns as identified by the annotation strings.

20 Claims, 6 Drawing Sheets

(51) Int. Cl.
*G06F 16/2457* (2019.01)
*G06Q 10/00* (2012.01)
*G06N 7/00* (2006.01)
*G06N 20/00* (2019.01)
*G06F 16/21* (2019.01)
*G06F 16/22* (2019.01)

(52) U.S. Cl.
CPC .......... *G06F 16/2365* (2019.01); *G06F 16/24* (2019.01); *G06F 16/24573* (2019.01); *G06N 7/005* (2013.01); *G06N 20/00* (2019.01); *G06Q 10/00* (2013.01)

(56) References Cited

U.S. PATENT DOCUMENTS

| | | | | |
|---|---|---|---|---|
| 2003/0163399 | A1* | 8/2003 | Harper | G06F 17/30893 705/35 |
| 2004/0243645 | A1* | 12/2004 | Broder | G06F 17/30616 |
| 2011/0264598 | A1 | 10/2011 | Fuxman et al. | |
| 2012/0330971 | A1* | 12/2012 | Thomas | G06F 17/30663 707/748 |
| 2013/0085910 | A1 | 4/2013 | Chew | |
| 2015/0331936 | A1* | 11/2015 | Alqadah | G06F 17/277 707/739 |
| 2016/0086240 | A1* | 3/2016 | Musgrove | G06F 17/30864 705/26.2 |

OTHER PUBLICATIONS

Shinzato, Keiji, and Satoshi Sekine. "Unsupervised extraction of attributes and their values from product description." In Proceedings of the Sixth International Joint Conference on Natural Language Processing, pp. 1339-1347. 2013. (Year: 2013).*

Patent Cooperation Treaty (PCT) International Search Report and Written Opinion in co-pending PCT International Appl. No. PCT/US2017/015002 (International Filing Date of Jan. 26, 2017) dated Apr. 4, 2017 (13 pgs.).

* cited by examiner

ANNOTATION SYSTEM FOR EXTRACTING ATTRIBUTES FROM ELECTRONIC DATA STRUCTURES

BACKGROUND

As electronic commerce and electronic inventory systems become more wide spread, new difficulties arise in regards to providing and ensuring the accuracy of product information. For example, in an electronic inventory, each separate product includes many different attributes. The attributes may include identifying numbers, prices, brand names, detailed descriptions and so on. Accordingly, ensuring the information is accurate when an individual category of the inventory may include thousands of separate products is a complex and time consuming task especially considering entering the information is a manual process.

For example, in the context of a grocery store, each product entered into the electronic inventory may include many different attributes such as weight, flavor, brand name, price, pieces per package and so on. The various attributes generally correlate with separate columns in a database and, thus, the information is manually reviewed and entered into the separate columns by workers. Furthermore, because the product descriptions are unstructured and do not follow any particular format, they may include grammatical errors, spelling errors, and/or other errors. Accordingly, simply copying the information into the database does not provide accurate and properly catalogued information. Thus, providing accurate product descriptions in a database is a difficult task with many complexities.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that transform description strings with unstructured attribute information about products into structured entries in a database that correlate the attribute information with appropriate columns. In one embodiment, a computing system accesses a data structure and reads attribute information in the form of description strings from the data structure for products that are classified in a single category. The category is, for example, yogurt, cheese, men's neck ties, or some other category of products. In either case, the products are generally related in kind. However, the description strings are unstructured because information included in the description strings is provided by various disparate sources and is not controlled to conform with any standard. That is, for example, the description strings are not organized in a systematic manner so that individual attributes can be extracted according to known placement, labeling or other known formatting. The description strings do not conform to any specific formatting, protocol or other arrangement. Thus, the description strings are unstructured.

In general, a description string for each product is, for example, a string of alphanumeric characters with each separate element (also referred to as a token herein) separated by a boundary marker (i.e., non-alphanumeric character or space). However, an order of attributes in the description strings, formatting of specific attributes, and use of abbreviations is not known or otherwise controlled according to a formatting standard. Thus, extracting attributes from the description strings is difficult due to the description strings being unstructured.

Accordingly, in one embodiment, the computing system is configured to identify the attributes in the description strings and map the attributes with the columns of the database so that the computing system can extract the attributes from the description strings. In this way, the computing system is programmed to populate the database using the attributes from the unstructured description strings to provide product descriptions in the database. The systems and methods associated with identifying and extracting the attributes will now be discussed.

Figure 1:
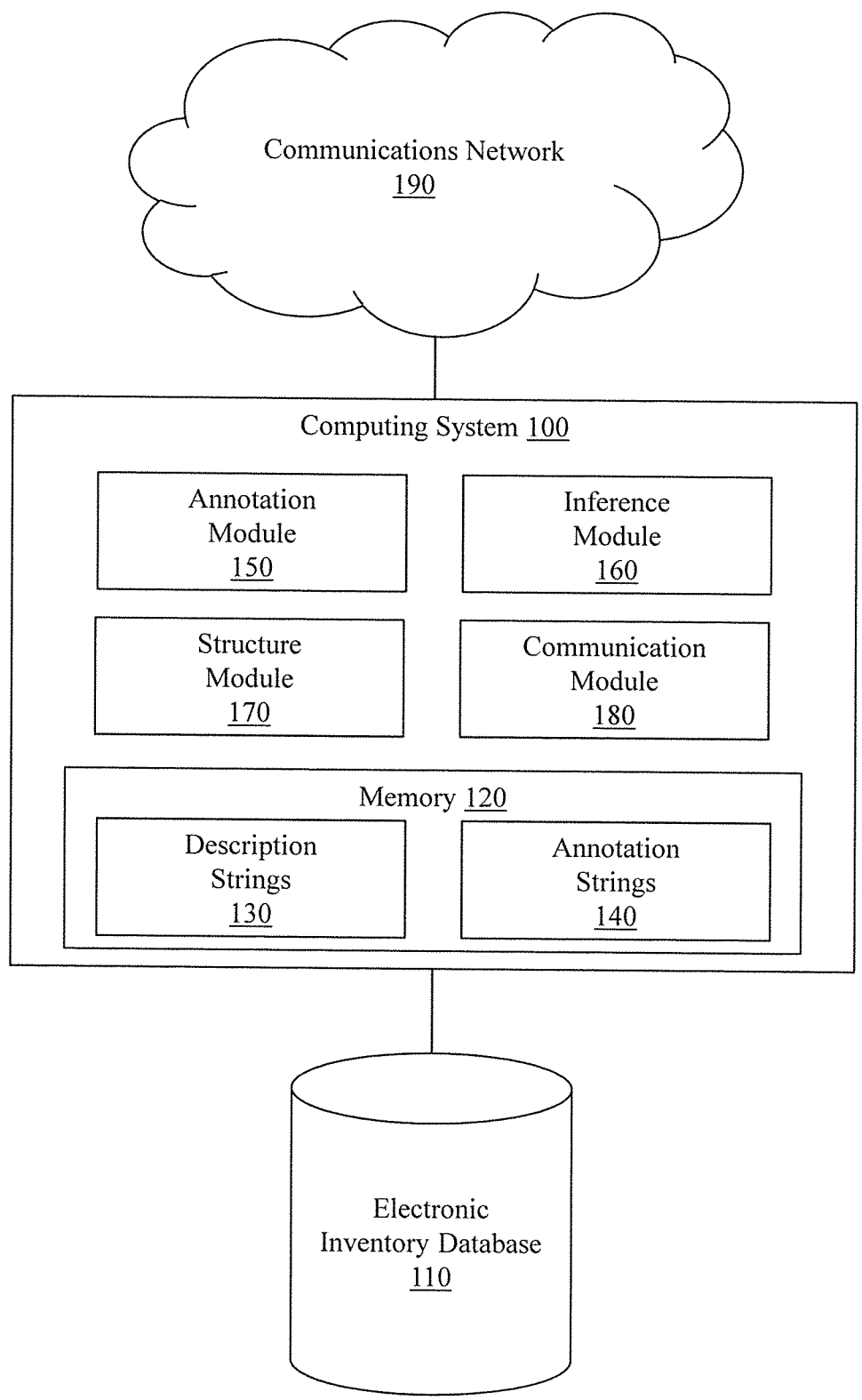
FIG. 1 illustrates one embodiment of a computing system associated with extracting attributes from unstructured description strings.

With reference to FIG. 1, one embodiment of a computing system 100 is illustrated. The computing system 100 is implemented to perform functions of mapping/linking product attributes with columns in an electronic/computerized inventory database 110 to identify and organize the attributes into the electronic/computerized inventory database 110.

In one embodiment, the computing system 100 is a computing/data processing system including an application or collection of distributed applications that are executable. The applications and computing system 100 may be configured to operate with or be implemented as a cloud-based networking system, a software as a service (SaaS) architecture, or other type of networked computing solution. In one embodiment the computing system 100 is a centralized server-side application that provides at least the functions disclosed herein and that is accessed by many users via computing devices/terminals communicating with the computing system 100 (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Accordingly, in one embodiment, the computing system 100 includes several modules along with a memory 120 storing description strings 130 and annotation strings 140. For example, the computing system 100 includes an annotation module 150, inference module 160, structure module 170 and communication module 180 that operate in conjunction to extract unstructured/unformatted attributes from the description strings 130 and output the attributes in a structured form (i.e., as a database table) into the electronic inventory database 110.

Thus, the modules 150, 160, 170, and 180 are, in one embodiment, embodied as a special purpose hardware processor to transform unstructured attributes into structured attributes and electronically output the structured attributes as an electronic data structure to the electronic inventory database 110. In another embodiment, the modules 150, 160, 170, and 180 function to control a hardware processor to accomplish transforming the unstructured attributes. Furthermore, the modules 150, 160, 170 and 180 operate on electronic data stored in the memory 120 and the database 110. In one embodiment, the memory 120 is a random access memory (RAM), a hard-disk drive (HDD), or another memory that is appropriate for storing electronic data structures that comprise the description strings 130, the annotation strings 140 and other information used for extracting and transforming as discussed herein.

Furthermore, the electronic inventory database 110 stores electronic data structures that include product information in a structured form of columns and rows so that the information can be indexed and used in various computerized tasks. In general, the electronic inventory database 110 stores data in an electronic format in a non-transitory medium. The data includes, for example, information for a plurality of products in an inventory of a retail business, such as, a grocery store, a department store, an ecommerce website, or other retail establishment.

Additionally, in one embodiment, separate columns are defined according to separate attributes of products. For example, the database 110 includes separate columns for identifier numbers (stock keeping unit (SKU)), brand name, weight, nutrition information and so on in order to separate different information of each product. Of course, depending on a particular category of products there may be different defined attributes and corresponding database columns than those listed. In either case, the database 110 includes separate columns for each attribute which the computing system 100 populates with attributes identified from the description strings 130.

In one embodiment, the computing system 100 obtains the description strings 130 over a communications network 190. That is, the computing system 100 is a hardware device that communicates over the communications network 190. The communication network 190 is, for example, the Internet, a wide area network (WAN), or a similar network. In one embodiment, the computing system 100 is controlled by the communication module 180 to communicate over the communications network 190 using a network interface card (NIC) or similar device embedded in the computing system 100 to exchange information (e.g., the description strings 130) with a remote device.

Figure 2:
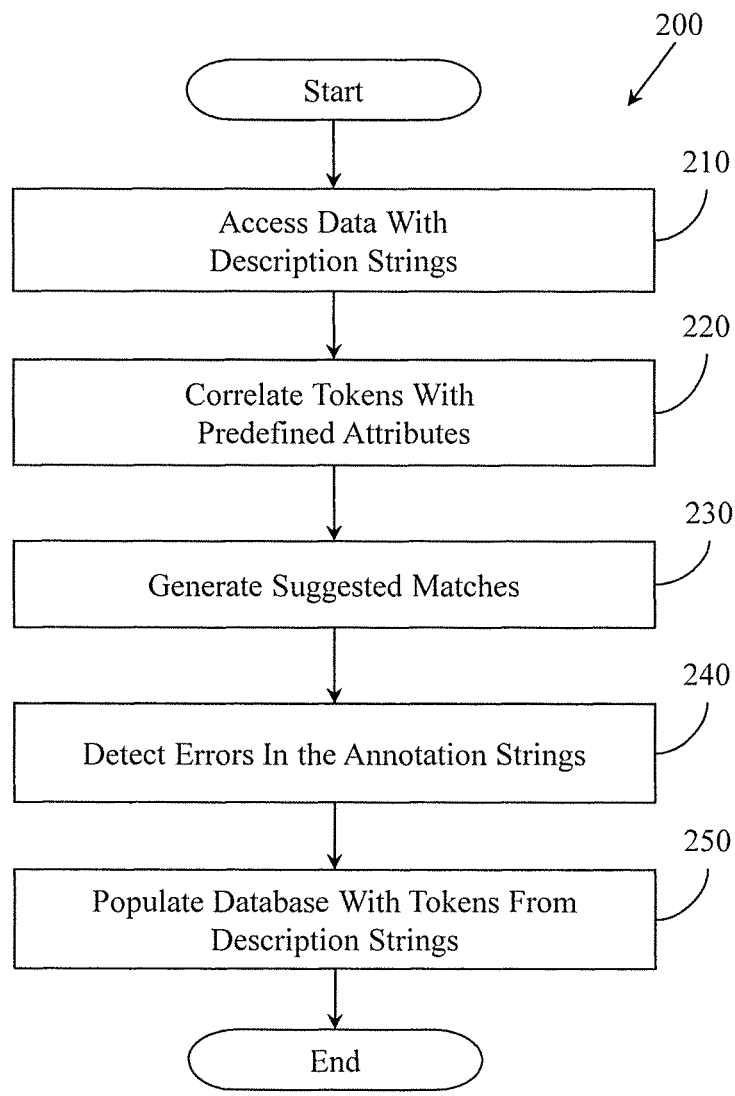
FIG. 2 illustrates one embodiment of a method associated with providing structured attributes for product descriptions in an electronic inventory database.

Further aspects of the computing device 100 will be discussed along with FIGS. 2-5. Method 200 of FIG. 2 illustrates a holistic view of how raw unstructured description strings are received, annotated, updated, verified, and then structured/organized into the electronic inventory database 110. Methods 300, 400, and 500 provide detailed descriptions of elements 220, 230, and 240 of method 200. Accordingly, each of the elements of method 200 will be discussed in a general context followed by a detailed description of elements 220, 230, and 240 along with FIGS. 3, 4 and 5, respectively. Furthermore, FIG. 2 through FIG. 5 will be discussed from the perspective of the computing system 100 of FIG. 1.

Accordingly, method 200 may be performed by the computing system 100 and initiated, at 210, in response to receiving a stream of electronic data over the communications network 190 from a remote device to access description strings 130 stored in the memory 110. In one embodiment, the communication module 180 receives the stream of data by detecting electronic communication signals from a link to the network 190, identifying the data from the signals, buffering the data and subsequently storing the data in the memory 120.

In general, the stream of data may be a communication from a retailer requesting a plurality of products be entered into a category of an inventory in the electronic inventory database 110. Accordingly, the data includes at least the description strings 130 describing the plurality of products. In one embodiment, the description strings 130 are combinations of alphanumeric characters that indicate attributes of the plurality of products. Furthermore, as previously specified, the description strings 130 are unstructured strings of data that do not conform to a defined protocol. That is, the description strings 130 do not include identifiers to indicate which characters correlate with which attribute in the database 110 and/or do not have a specific ordering or other organization to identify the attributes.

The description strings 130 are strings of characters. In one embodiment, the description strings 130 do include boundary markers between various tokens (i.e., words and characters that makeup attributes). However, it should be noted, that the boundary markers, while separating some attributes, are not considered to be consistent and thus some attributes may occur consecutively without a boundary marker. Nevertheless, a series of consecutive characters between boundary markers are defined as a single token. In general, the annotation module 150 and the inference module 160 operate on tokens.

Thus, each of the description strings 130 generally include multiple tokens. The tokens are of varying lengths. That is, the tokens may include different numbers of alphabetic and/or numeric characters (i.e., alphanumeric characters). Additionally, the boundary markers separating the tokens are non-alphanumeric characters, such as, spaces, and other symbols (e.g., %, #, /). Accordingly, in one embodiment, the communication module 180 accesses the description strings 130 by reading electronic data structures that store the description strings in the memory 110 and communicating the description strings to a the modules 150, 160 and 170 as necessary.

At 220, the annotation module 150 correlates some of the tokens with defined attributes (i.e., columns) in the database 110. The correlating, at 220, will be discussed in greater detail with reference to FIG. 3 and method 300 subsequently. However, in general, correlating the tokens from the description strings 130 with the defined attributes in the electronic inventory database 110 serves as, for example, an initialization to partially populate the annotation strings 140.

That is, for example, because subsequent elements may use correlations derived from known relationships between the tokens and the defined attributes, identifying at least some matches between the tokens and the defined attributes can improve, for example, generating matches, at 230. In either case, at 220, the annotation module 150 identifies which of the defined attributes match the tokens to map/link at least a portion of the tokens with the defined attributes.

In one embodiment, the annotation module 150 uses the annotation strings 140 to identify tokens in the description strings 130 and map the tokens with the defined attributes. For example, each of the annotation strings 150 include placeholders for each value in each of the description strings 130. That is, the annotation strings 140 correspond with the description strings 130 in a one-to-one correspondence. Thus, each of the description strings 130 has a corresponding annotation string 140.

Additionally, each of the annotation strings 140 includes a same number of characters as a respective description string. When the annotation module 150 identifies a match between a token in a description string 130 and a defined attribute in the database 110, corresponding locations in a respective annotation string 140 are marked/annotated with a unique identifier of the defined attribute to map the match between the description string 140 and the defined attribute. In this way, the computing system 100 uses the annotation strings 140 to track which of the tokens have been identified and which are still unidentified. Examples of the annotation strings 140 will be discussed in greater detail subsequently and are shown in Tables 1 and 4.

At 230, the inference module 160 generates suggested matches for the unidentified tokens. That is, after completion of the correlating at 220, part of the tokens are identified while the rest of the tokens are unidentified (i.e., not matched with a column/attribute in the database 110). Thus, to further identify the tokens, the inference module 160 infers matches for all or a portion of the unidentified tokens according to known correlations between identified tokens and the defined attributes. In one embodiment, the inference module 160 infers (i.e., deduces) the matches using a statistical model that is a function of the correlations. For example, the inference module 160 may execute machine learning routines that are based, at least in part, on conditional random fields (CRF) analysis to generate the statistical model.

Subsequently, the inference module 160 generates the suggested matches by, for example, using the annotation strings 140 and the description strings 130 as an electronic input to train (i.e., generate) the model. The inference module 160 uses identified correlations and other information from the model to generate suggested matches for the unidentified tokens. Furthermore, in one embodiment, the suggested matches for the unidentified tokens are reviewed and either accepted or denied. For example, the suggested matches may be transformed into a graphical user interface (GUI) and displayed to a user for verification. Thus, the communication module 180 may provide the GUI with the suggested matches over the communication network 190 to a remote device, causing the remote device to display the GUI with the suggested matches to the user. Thereafter, the user may selectively verify which of the suggested matches are correct (i.e., which suggested matches should be used to update the annotation strings and to map the unidentified tokens to columns in the database 110).

In general, the correlations may include typical lengths of tokens associated with certain attributes, presence of certain characters, relative locations of characters in the description strings for certain attributes, and so on. In this way, the inference module 160 provides suggestions for matches that are used to iteratively update the annotation strings and map the unidentified tokens to columns in the database 110.

Additionally, while more detail of block 230 will be discussed subsequently with method 400, it should be understood that updating the annotation strings 140 occurs iteratively, with each subsequent iteration applying improvements to the model gleaned from the current suggested matches in order to improve matching with each subsequent iteration. Thus, the inference module 160 may iteratively generate suggested matches to update the annotation strings 140 until, for example, the inference module 160 cannot generate any new matches between unidentified tokens and defined attributes.

At 240, the annotation module 150 detects errors in the annotation strings 140. In one embodiment, the annotation module 150 performs consistency checking by analyzing the annotation strings at 230 to verify accuracy of mappings between the description strings 140 and the defined attributes. Accordingly, in one embodiment, the original annotation strings 140, as completed at 230, are compared with new annotation strings that are fully generated by the inference module 160. Inconsistencies between the two sets of annotation strings are, for example, identified as possible errors.

Furthermore, in one embodiment, the identified possible errors may be reviewed and either accepted or denied. For example, the possible errors may be transformed into a graphical user interface (GUI) and displayed to a user for verification. Thus, the communication module 180 may provide the GUI with the errors over the communication network 190 to a remote device, causing the remote device to display the GUI with the errors to the user. Thereafter, the user may selectively verify which of the errors are valid (i.e., which annotations should be replaced because of errors). Thus, the GUI generates a control input according to interactions from the user that is communicated back to the communication module 180. Subsequently, the computing system 100 updates the annotation strings 140 according to the control input. Further aspects of error detection will be discussed along with method 500 subsequently.

At 250, the structure module 170 outputs the results of the blocks 220-240 to the electronic inventory database 110. In one embodiment, the structure module 170 uses the annotation strings 140 to extract the attributes from the respective description strings 130 into an electronic data structure that is, for example, a database table. The database table includes, for example, separate columns that correlate with each of the defined attributes as specified in the electronic inventory database 110. Accordingly, the structure module 170 uses the annotation strings 140 to extract values (e.g., the tokens) of the defined attributes from the description strings 130 and store the values in the appropriate columns of the table.

In this way, the structure module 170 structures the description strings 130 by organizing and linking the attributes from the description strings 130 into appropriate columns so that the attributes can be identified and used in the database 110. Thereafter, the structure module 170 stores the table in the database 110 to populate descriptions of the products with relevant information in an organized format. Accordingly, the computing system 100 operates according to the method 200 to receive/access attribute information in unstructured description strings and transform the description strings into database tables in the inventory database 110 so that the attributes can be indexed, sorted, queried and otherwise computerized for electronic applications.

Figure 3:
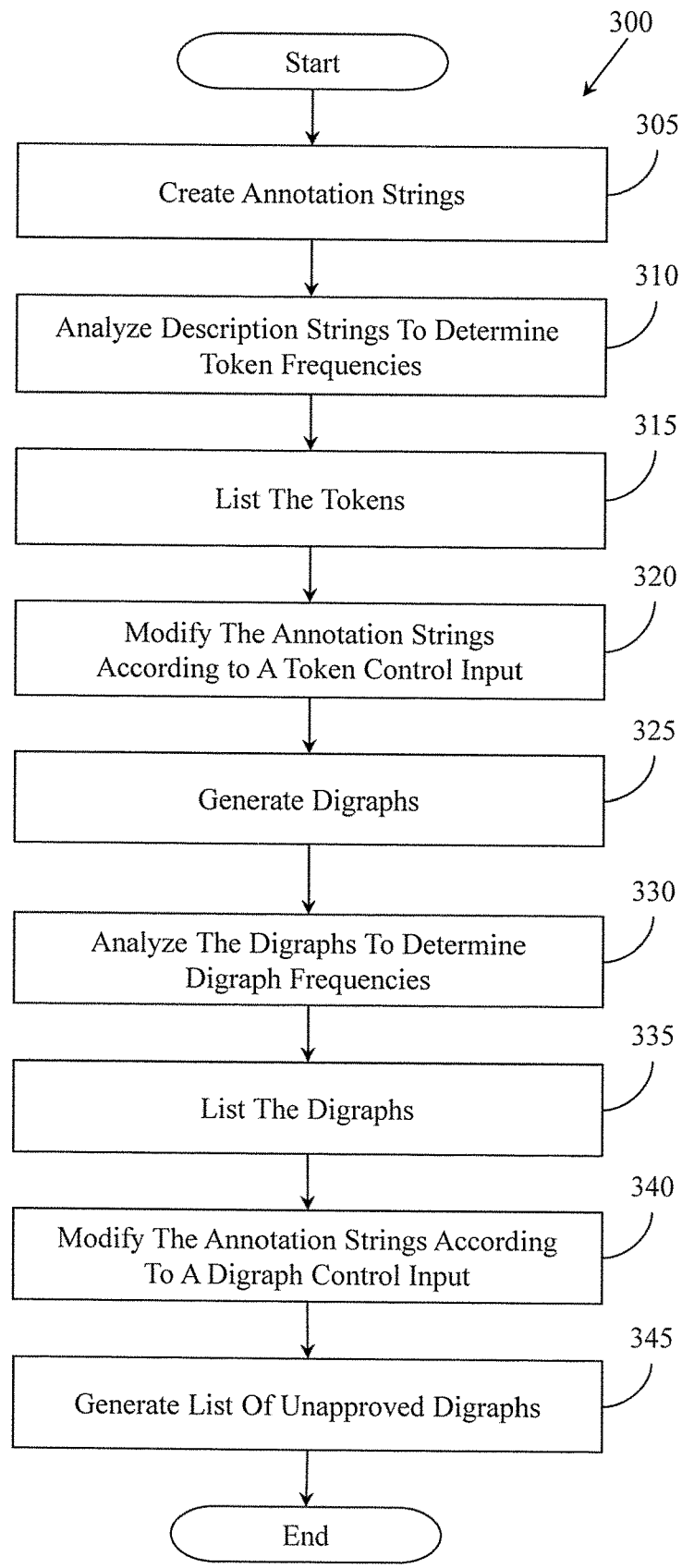
FIG. 3 illustrates one embodiment of a method associated with annotating strings to link values in description strings with defined attributes.
Figure 4:
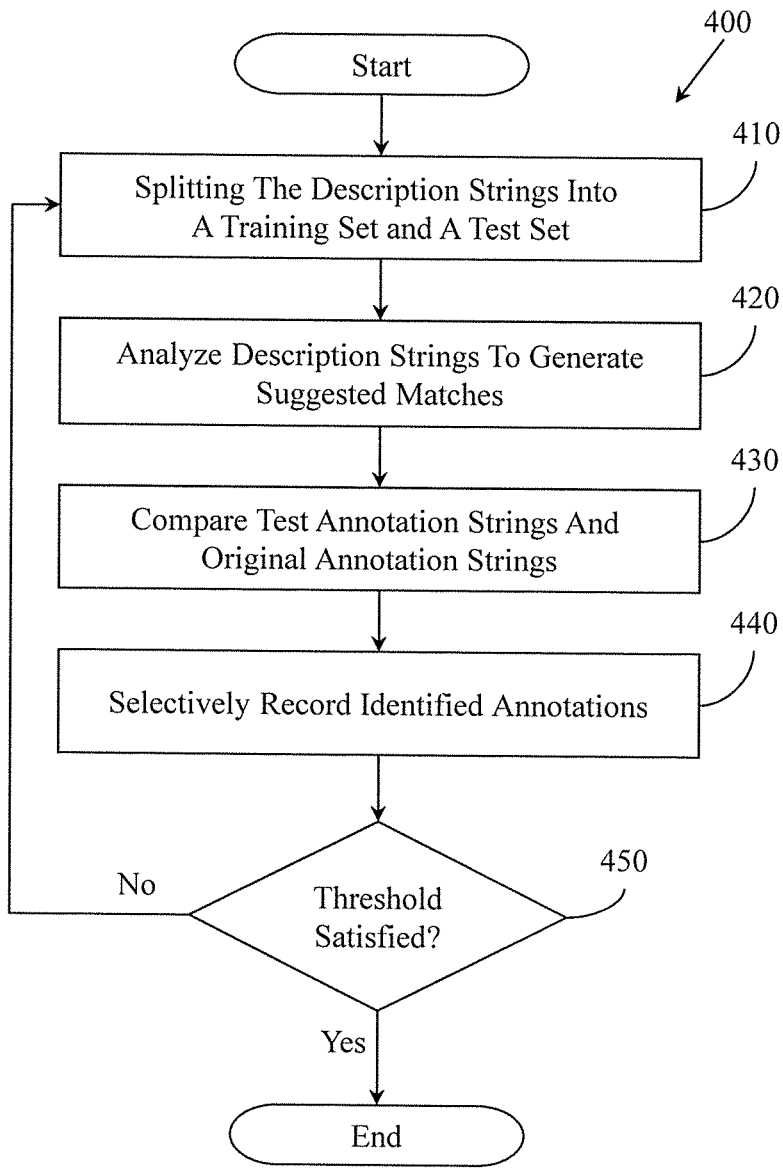
FIG. 4 illustrates an embodiment of a method associated with generating suggested matches between defined attributes and values in unstructured description strings.
Figure 5:
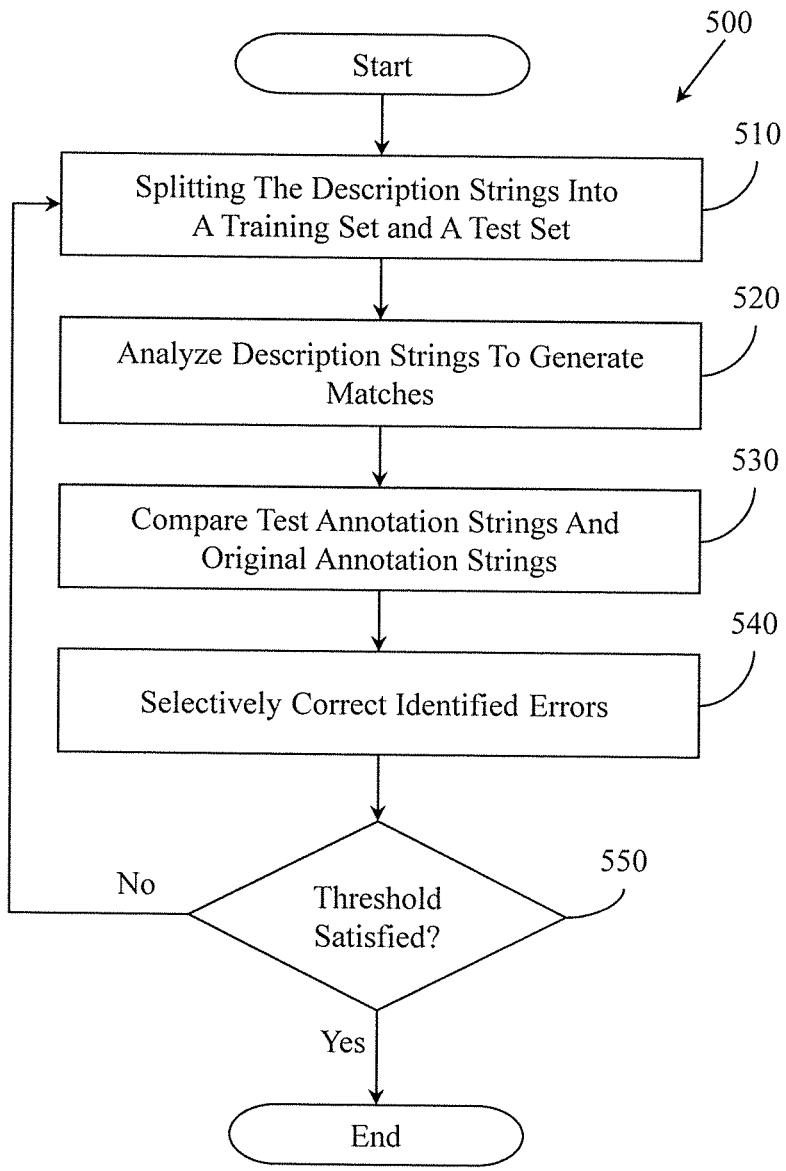
FIG. 5 illustrates an embodiment of a method associated with correcting errors in annotations of description strings.

With reference to FIG. 3, the method 300 is illustrated. As previously explained, the method 300 illustrates additional details about block 220 of FIG. 2. Accordingly, the method 300 is, in one embodiment, performed by the annotation module 150.

Thus, at 305, the annotation module 150 creates the annotation strings 140. In one embodiment, the annotation module 150 creates the annotation strings by generating an electronic data structure in the memory 120 that includes a separate string that correlates with each of the description strings 130. Additionally, the annotation module 150 initializes each of the annotation strings 140 with values that specify the tokens in the description strings 130 are all unidentified.

Table 1 illustrates an example of three separate description strings and corresponding annotation strings after the annotation module 150 generates and initializes the annotation strings 140. The description strings in Table 1 correlate with three separate products in a yogurt category. Furthermore, Table 1 illustrates how each annotation string 140 includes a one-to-one correspondence of characters with the respective description strings 130. The values "O" in the annotation strings are the values used to indicate that associated characters that are either boundary markers or parts of tokens are unidentified. While "O" is used in the present example, it is envisioned that any unique character may be used.

TABLE 1

| Description string: | Corresponding Annotation string: |
|---|---|
| Danone strawb yogurt 50 gr | OOOOOOOOOOOOOOOOOOOOOOOO |
| Yoplait apple/ strawb 6 pk100 gr | OOOOOOOOOOOOOOOOOOOOOOOOOO |
| Yoplait lowfat yogurt 4X50 gr | OOOOOOOOOOOOOOOOOOOOOOOOOOO |

At 310, the annotation module 150 analyzes the description strings 130 to determine token frequencies. The token frequencies are, for example, a number of occurrences for each distinct token in the description strings 130. In general, a token is defined as a set of consecutive alphabetic or numeric characters separated from other characters in a description string by non-alphanumeric characters (e.g., "%", "#", "!", "?", " ") also referred to herein as boundary markers. Thus, a distinct token is any unique set of characters separated from other characters by boundary markers or, for example, as a switch between numbers and alphabetic characters.

Accordingly, the annotation module 150 determines the token frequencies by scanning (i.e., parsing) the descriptions strings 130 for the distinct tokens, comparing distinct tokens to tokens in the strings and, for example, maintaining a count for each match of a distinct token.

Thereafter, at 315, the annotation module 150 lists the tokens by filtering the tokens according to the token frequencies for the distinct tokens. Thus, the annotation module 150, in one embodiment, sorts the distinct tokens according to the token frequencies and outputs the sorted distinct tokens in a list. In one embodiment, the list is communicated by the communication module 180 over the communication network 190 causing the list to be displayed on a GUI of a remote device as an alert or other prompt to a user.

TABLE 2

Example (list of distinct tokens)

List of tokens and counts:

| Description string: | Token | Count | Token | Count |
|---|---|---|---|---|
| Danone strawb yogurt 50 gr | gr | 3 | 6 | 1 |

TABLE 2-continued

Example (list of distinct tokens)

List of tokens and counts:

| Description string: | Token | Count | Token | Count |
|---|---|---|---|---|
| Yoplait apple/ strawb 6 pk100 gr | yogurt | 2 | pk | 1 |
| Yoplait lowfat yogurt 4X50 gr | 50 | 2 | lowfat | 1 |
| | yoplait | 2 | 4 | 1 |
| | strawb | 2 | x | 1 |
| | danone | 1 | 100 | 1 |
| | apple | 1 | | |

Table 2 illustrates an example list of tokens for a group of three description strings. As seen in the example list, the token "gr" has a highest token frequency of 3 with other tokens of lower token frequencies following in the list. While all of the tokens are listed in the example of Table 2, in one embodiment, the annotation module 150 may list only tokens of a frequency greater than N in order to display tokens of greater interest.

At 320, the annotation module 150 modifies the annotation strings according to a token control input. In one embodiment, the annotation module 150 receives the token control input from the GUI on the remote device via the communication module 180. In another embodiment, the token control input may be automatically generated according to defined correlations of tokens and/or an electronic input by a user through I/O ports of the computing system 100. In still further embodiments, the token control input is automatically generated according to defined rules for matching tokens with attributes.

In either case, the token control input correlates at least part of the tokens with the defined attributes. In one embodiment, the annotation module 150 assigns unique labels to distinct tokens when correlated with the defined attributes. Table 3 illustrates labels (i.e., unique identifiers) that are assigned to each distinct token with a token frequency greater than 2.

Thus, the annotation module 150 annotates (i.e., marks) annotation

TABLE 3

Example (high-frequency tokens)
High-frequency tokens (N >= 2):

| Token | Count | label | Comment |
|---|---|---|---|
| gr | 3 | U | labeled unit of measure as U |
| yogurt | 2 | T | labeled product type as T |
| 50 | 2 | V | labeled volume as V |
| yoplait | 2 | B | labeled brand as B |
| strawb | 2 | F | labeled flavor as F | strings with the labeled distinct tokens at locations corresponding to the distinct tokens. In one embodiment, the annotation module 150 annotates by modifying locations in the data structures of the annotation strings 140 that correspond to the labeled tokens as identified according to the token control input.

One example of modifying the annotation strings 140 is shown in Table 4. Table 4 illustrates the same three description strings as illustrated in Tables 1 and 2. In Table 4, the corresponding annotation strings have been modified by the annotation module 150 to reflect the labeled tokens. It should be noted that each character in the description string of a product has a corresponding character in the annotation string that either indicates an identifying label for a token or indicates a token is unidentified (i.e. "O") as originally initialized.

TABLE 4

Example (Modified annotation strings)

| Description string: | Corresponding Annotation string: |
|---|---|
| Danone strawb yogurt 50 gr | OOOOOOOFFFFFFOTTTTTTOVVUU |
| Yoplait apple/strawb 6 pk100 gr | BBBBBBBOOOOOOOOFFFFFFOOOOOOOOUU |
| Yoplait lowfat yogurt 4X50 gr | BBBBBBBOOOOOOOOOTTTTTTOOOVVUU |

Continuing with method 300, elements 325-345 of method 300 generally illustrate how the annotation strings are refined. That is, once the annotation strings have been initially annotated to map/link at least some of the tokens and the defined attributes of the database 110, the annotation module 150 refines the annotation strings to further identify which of the defined attributes correspond with the unidentified tokens.

At 325, the annotation module 150 initiates refining of the annotation strings 140 by generating digraphs according to neighboring tokens. In one embodiment, the annotation module 150 generates the digraphs by generating an electronic data structure (e.g., linked list, tree struct) in the memory 120 to store relations of neighboring tokens and subsequently populating the electronic data structure with relationships between tokens defining the digraphs.

Furthermore, a digraph as used within this disclosure is any combination of two neighboring tokens in an individual description string. Accordingly, each digraph includes a first token and a second token. Since the general purpose of method 300 is to correlate tokens with the defined attributes, the annotation module 150 generates digraphs where the first token is an identified token and a second token is unidentified. In this way, further analysis of the tokens and correlations between neighboring tokens that may provide insights into whether an unidentified token correlates to a same attribute as the identified token can be analyzed.

Accordingly, at 330, the annotation module 150 analyzes the digraphs to determine digraph frequencies for distinct digraphs (i.e., distinct pairs of tokens). The annotation module 150 performs similar functions at block 330 as those of block 310 with the exception of operating on digraphs instead of individual tokens. Thus, the annotation module 150, at 330, scans the description strings 130 for matching distinct digraphs and maintains a count of the digraph frequencies for each distinct digraph. In this way, a number of occurrences for each distinct digraph can be determined.

At 335, the annotation module 150 lists the digraphs by filtering the digraphs according to the digraph frequencies. In one embodiment, the annotation module 150 sorts the distinct digraphs according to the digraph frequencies and outputs the sorted digraphs into a list. In one embodiment, the list is communicated by the communication module 180 over the communication network 190 causing the list to be displayed on a GUI of a remote device as an alert or other prompt to a user.

TABLE 5

Example (list of partially annotated neighboring digraphs) (Note - provided example data may not accurately represent expected count values from actual application)

| Description strings with Annotation strings: | Digraph | | | | |
|---|---|---|---|---|---|
| | Token1 | Token2 | Label1 | Label2 | Count |
| Danone strawb yogurt 50 gr | danone | strawb | — | F | 1 |
| OOOOOOOFFFFFFOTTTTTTOVVUU | yoplait | apple | B | — | 1 |
| Yoplait apple/strawb 6 pk100 gr | apple | strawb | — | F | 1 |
| BBBBBBBOOOOOOOOFFFFFFOOOOOOOOUU | strawb | 6 | F | — | 1 |
| | 100 | gr | — | U | 1 |
| Yoplait lowfat yogurt 4X50 gr | yoplait | lowfat | B | — | 1 |
| BBBBBBBOOOOOOOOOTTTTTTOOOVVUU | lowfat | yogurt | — | T | 1 |
| | yogurt | 4 | T | — | 1 |
| | x | 50 | — | V | 1 |

Table 5 illustrates a continuation of the example from previous Tables 1-4. In general, the digraphs provide insights to circumstances where an entire digraph (i.e., multiple tokens) should be annotated together as a single attribute. For example, a brand name that includes two tokens instead of a single token may be fully annotated after analyzing the digraphs. In Table 5, combinations of Token1 and Token2 represent digraphs.

At 340, the annotation module 150 modifies the annotation strings 140 by substituting an annotation of the first token for an annotation of the second token according to a digraph control input. In one embodiment, the annotation module 150 receives the digraph control input from the GUI on the remote device via the communication module 180. In another embodiment, the digraph control input may be automatically generated according to defined correlations of digraphs and/or an electronic input by a user through I/O ports of the computing system 100. In either case, the annotation module 150 uses the digraph control input to correlate tokens within digraphs that correspond with the same defined attributes.

TABLE 6

Example (Digraph Control Input approves/
disapproves annotation for neighboring digraphs)
Digraph

| Token1 | Token2 | Label1 | Label2 | Count | Approved |
|--------|--------|--------|--------|-------|----------|
| danone | strawb | —      | F      | 1     | No       |
| yoplait| apple  | B      | —      | 1     | No       |
| apple  | strawb | —      | F      | 1     | Yes      |
| strawb | 6      | F      | —      | 1     | No       |
| 100    | gr     | —      | U      | 1     | No       |
| yoplait| lowfat | B      | —      | 1     | No       |
| lowfat | yogurt | —      | T      | 1     | No       |
| yogurt | 4      | T      | —      | 1     | No       |
| x      | 50     | —      | V      | 1     | No       |

Table 6 illustrates the digraph control input as the "Approved" column. In the example of Table 6, the digraph control input has indicated approval for the combination of "apple" and "strawb." That is, the approval indicates that the label used for token "strawb" (i.e., Label "F") and a corresponding defined attribute also apply to token "apple." Thus, as shown in Table 7, the annotation module 150 updates a corresponding annotation string for the description string that includes the digraph to reflect the identified token.

TABLE 7

Example (update annotations for neighboring digraphs)

| Description string: | Corresponding Annotation string: |
|---------------------|----------------------------------|
| Danone strawb yogurt 50 gr | OOOOOOOFFFFFFOTTTTTTOVVUU |
| Yoplait apple/strawb 6 pk100 gr | BBBBBBBOFFFFFOFFFFFFOOOOOOOUU |
| Yoplait lowfat yogurt 4X50 gr | BBBBBBBOOOOOOOOTTTTTTOOOVVUU |

In this way, annotations of the description strings 130 are refined to further correlate unidentified tokens with the defined attributes of the electronic inventory database 110.

While a single refinement of the annotation strings 140 to identify further tokens is discussed, of course, refining the annotation strings 140 from block 325-345 may occur iteratively until, for example, a frequency of highest-frequency partially annotated digraphs (i.e., digraphs with one identified token and one unidentified token) satisfy a threshold amount (e.g., <N) or no further digraphs are approved for annotation substitution.

Furthermore, at 345, the annotation module 150 generates a list of unapproved digraphs (i.e., unapproved as listed in Table 6) that indicates which of the digraphs were not approved for substituting annotations. When subsequent iterations of the refinement are undertaken, unapproved digraphs may be hidden from the list since they have already been reviewed for approval. Thus, the list of unapproved digraphs may simplify listing, at 335, when subsequent iterations are undertaken.

After method 300 is complete, the computing system 100 proceeds with block 230 of method 200 which corresponds to method 400. Method 400 is generally performed by the inference module 160 of the computing system 100 to generate suggested matches according to correlations deduced from the annotation strings 140 and the description strings 130 after completion of method 300. In this way, relationships between the tokens and characters of the description strings as accumulated by the annotation strings 140 are used to further identify the tokens.

Accordingly, at 410, the inference module 160 initiates the method 400 by splitting the plurality of products into a training set and a test set. In one embodiment, the splitting, at 410, includes grouping description strings and annotation strings for a first group of the products into a training set and grouping description strings and annotation strings for a second group of the products into a test set. The subsequent blocks produce new test annotation strings for description strings in the test set, which will be discussed in greater detail subsequently. The new test annotation strings are compared against the original test annotation strings from the annotation strings 140 to find the new matches of tokens and attributes.

Additionally, in one embodiment, the inference module 160 splits/groups the products (i.e., the description and annotation strings) according to a selected distribution to provide two separate sets of strings as an electronic input to subsequent blocks 420-440. The selected distribution for splitting the products may include one or more of several different options. For example, the products may be split randomly into the two sets, split according to annotation quality of annotation strings (e.g., higher percent annotated in training set vs lower percent in test set), and/or according to a single attribute at a time.

Table 9 illustrates one example of splitting products into sets. In Table 9, the inference module 160 has grouped strings between sets according to attributes. That is, the inference module 160 grouped description strings with identified tokens for a brand attribute into the training set while grouping description strings with no identified token for the brand attribute into the test set.

TABLE 9

Example (split into training and test set
according to Brand (i.e., attribute))

| Description string: | Annotated string: |
|---------------------|-------------------|
| Training set        |                   |
| Yoplait apple/strawb 6 pk100 gr | BBBBBBBOFFFFFOFFFFFFOOOOOOOUU |
| Yoplait lowfat yogurt 4X50 gr | BBBBBBBOOOOOOOOTTTTTTOOOVVUU |
| Test set            |                   |
| Danone strawb yogurt 50 gr | OOOOOOOFFFFFFOTTTTTTOVVUU |

In one embodiment, the selected distribution is selected to create a training set that includes annotation strings with correlations that can be used for machine learning. For example, the correlations and more complete information from the training set annotation strings are used by the inference module 160 to train a statistical model according to the correlations and other data that is representative of matches between the description strings 130 and the defined attributes of the database 110.

In either case, the products are split into groups at 410 with each separate iteration of method 400. Furthermore, subsequent iterations may use the same split or a different split (e.g., according to different attribute or different option) depending on a selection as specified by the pre-selected distribution.

After the products are split into the sets, the inference module 160, at 420, suggests matches between the tokens of the test set and the defined attributes. In one embodiment, the inference module 160 infers the matches according to correlations between the tokens of the training set and the defined attributes.

For example, as an initiating action for block 420, the inference module 160 uses machine learning techniques to model information from the annotation strings 140 in the training set and the description strings 130 of the training set. In one embodiment, the machine learning techniques include using a conditional random fields (CRF) analysis on the training set. The inference module 160 executes the CRF analysis by parsing, scanning, and otherwise analyzing the training set to recognize patterns/correlations between data elements in the training set. The training set generally serves as a sample set that embodies examples of patterns between attributes. Accordingly, the inference module 160 uses the CRF analysis to learn, at a character level, (1) values and features of attributes and (2) relations/correlations between neighboring characters of attributes/tokens.

That is, the inference module 160 generates an electronic data structure that models the values and features of the attributes and the relationships/correlations between neighboring characters for identified tokens that match the defined attributes. Subsequently, the inference module 160 applies the information in the model to generate suggested matches between tokens of the description strings 130 in test set and the defined attributes of columns in the database 110.

For example, the CRF analysis of the training set learns some actual values for each attribute (i.e., values that correlate in the training set). Additionally, the CRF analysis also learns features of attributes, such as, typical length of values for attributes (e.g., lengths of units of measure vs brand names), whether values associated with certain attributes include numeric characters (e.g., volume, weight, etc.), and relative locations of values in the description strings for certain attributes (e.g., brand values occurring at the beginning vs size at the end).

Furthermore, the inference module 160 further executes the CRF analysis by parsing and scanning the training set data to learn if certain characters are associated with a certain attribute, what attribute a neighboring character is likely associated with and so on. As an example, the inference module 160 may indicate that after a series of numbers a following alphabetic token is likely a unit of measure. In either case, the inference module 160 generates and collects data from the training set that characterizes probabilities of tokens matching certain attributes, and generates a statistical model that is stored in the memory 120.

Thereafter, the inference module 160 uses the model to infer the matches and newly annotate the test annotation strings for the description strings 130 of the test set. In this way, the inference module 160 generates a new annotation string for each of the description strings 130 of the test set and suggests likely matches between tokens in the description strings 130 of the test set and the defined attributes.

The inference module 160 annotates the new test annotation strings according to the suggested matches as a result of block 420. Thus, the inference module 160 may store the new test annotation strings in the memory 120.

At 430, the inference module 160 compares the new test annotation strings produced at 420 with the original annotation strings 140 for products in the test set. Comparing the annotation strings from the test with the original annotation strings identifies defined attributes for previously unidentified tokens in test set.

TABLE 10

Example (new attribute values from the annotations produced by the inference module 160 of strings in test set) Here, the inference module 160 automatically annotated Danone as B, based on brands annotated in the training set. Danone was not already recorded as a brand, and thus the inference module 160 has automatically found a new brand for identifying tokens.
Test set

| Description string: | Annotation string: |
|---|---|
| Danone strawb yogurt 50 gr | OOOOOOOFFFFFFOTTTTTTOVVUU (Original Annotation String) BBBBBBOFFFFFFOTTTTTTOVVUU (Generated New Annotation String) |
| Newly identified token | |
| brand: Danone | |

Table 10 illustrates how the inference module 160 automatically annotates the brand attribute on the test string, which was previously unidentified in the original annotation string for this product. Accordingly, at 430, when the inference module 160 compares the strings the newly identified token is suggested as a match.

At 440, the inference module 160 selectively records annotations for the newly identified tokens from the new test annotations strings to the original annotation strings 140. In one embodiment, the inference module 160 may list the inferred matches from 430 and provide the list for approval. In one embodiment, the list is communicated by the communication module 180 over the communication network 190 causing the list to be displayed on a GUI of a remote device as an alert or other prompt to a user.

Furthermore, in one embodiment, the inference module 160 receives an approval control input from the GUI on the remote device via the communication module 180. In another embodiment, the approval control input may be automatically generated according to defined rules (e.g., always approve inferred matches, approve when the number of the same match exceeds a threshold, etc.) and/or an electronic input by a user through I/O ports of the computing system 100. In either case, the approval control input controls whether suggested matches produced at block 420 are recorded to the original annotation strings 140.

At 450, the inference module 160 determines whether a number of the suggested matches from block 420 satisfies a defined threshold. The defined threshold indicates a condition, such as, no further inferred matches produced from performing method 400 or suggested matches below a defined number. In general, the defined threshold is selected such that the inference module 160 iteratively generates suggested matches and updates the annotation strings until, for example, no further improvements are obtained.

Accordingly, in one embodiment, the inference module 160 is configured to repeat blocks 410-450 to further update the annotation strings 140 for many iterations. In general, the inference module 160 repeats method 400 since each newly identified token that is recorded is subsequently used to update the model at 420. Thus, each subsequent iteration includes improved model data for inferring additional matches. Consequently, subsequent iterations may suggest matches for tokens that were previously missed. In this way, the inference module 160 iteratively analyzes the strings to improve identification of the tokens and thus also improve extraction of the attributes.

Method 500 describes aspects of detecting errors in the annotation strings 140 as briefly described at 240 of FIG. 2. Furthermore, method 500 is similar in several aspects to method 400. For example, it is the general intent of method 500 to identify matches between tokens and the defined attributes for the annotation strings. That is, a result of method 400 is, for example, a complete annotation of all of the annotation strings 140. Accordingly, method 500 seeks to identify discrepancies in the annotation strings 140 by re-generating the annotations. For example, the computing device 100, and, more specifically the inference module 160, performs method 500 to identify new test annotation strings using the CRF analysis discussed previously. In this way, the inference module 160 produces an additional set of annotation strings to cross validate the original annotation strings 140 and check a consistency of the annotations to verify accuracy of correlations between the annotation strings 140 and the defined attributes as provided from method 400.

As stated, method 500 includes several aspects that are similar to method 400. Accordingly, for purposes of brevity, reference will generally be made back to method 400 while pointing out differences between method 500 and method 400.

The inference module 160 initiates method 500, at 510, by splitting the description strings and respective annotation strings into a training set and a test set. As discussed in relation to 410 of method 400, splitting the strings into the training set and the test set generally includes grouping some of the strings into each set and initializing test annotation strings for each description string in the test set. Similarly, at 510, the description strings and the annotation strings are split into respective groups and the new test annotation strings are created for description strings in the test set.

However, at 510, the products are, for example, randomly split into the two sets. This is because the tokens from the description strings 130 have already been annotated in the annotation strings 140 as discussed above with method 400. Thus, splitting the products according to the other specified options does not necessarily improve operation of method 500 since the annotation strings 140 are already complete.

At 520, the inference module 160 infers matches between the tokens of the test set and the defined attributes as specified in relation to block 420. The primary difference between 520 and 420 is that the inference module 160 uses the training and CRF analysis to identify discrepancies between the previously identified tokens and the suggested matches, at 520, instead of identifying new tokens as at 420. This is because the tokens were previously identified with method 400 and method 500 is detecting errors, not identifying new tokens. Accordingly, the inference module 160 newly annotates/maps all of the tokens for the test set at 520 to provide new test annotation strings for comparison at 530.

Continuing with method 500, at 530, the inference module 160 compares the test annotation strings with the original annotation strings 140 for products in the test set. The comparing at 530 identifies suggested errors between the original annotation strings 140 and generated new test annotation strings for products in the test set. The inference module 160 stores the suggested errors in a list or otherwise displays the suggested errors for subsequent approval/disapproval.

At 540, the inference module 160 selectively corrects the original annotation strings 140 for the suggested errors. In one embodiment, the inference module 160 receives an error control input indicating whether to correct each of the suggested errors. In one embodiment, the error control input indicates a crowd sourced approval/disapproval from a group of users tasked with editing the attributes. Additionally, in another embodiment, the inference module 160 may automatically correct all suggested errors or correct the suggested errors when, for example, the number of the same error exceeds a threshold. In this way, incorrectly annotated tokens are identified and corrected in order to improve accuracy of extracting the attributes from the description strings 130.

At 550, the defined threshold is checked. In one embodiment, the predetermined threshold may be a number of iterations of method 500 for checking errors. In another embodiment, the defined threshold indicates that method 500 is to repeat until no further errors are approved. In this way, similar to iterating in method 400, the model may be improved by updating the annotation strings 140 with more accurate data that leads to additional suggested errors for subsequent iterations. Moreover, by iteratively repeating method 500, all description strings will ultimately be included in a test set of at least one of the iterations and, thus, will be checked for possible errors at least once.

Computing Device Embodiment

Figure 6:
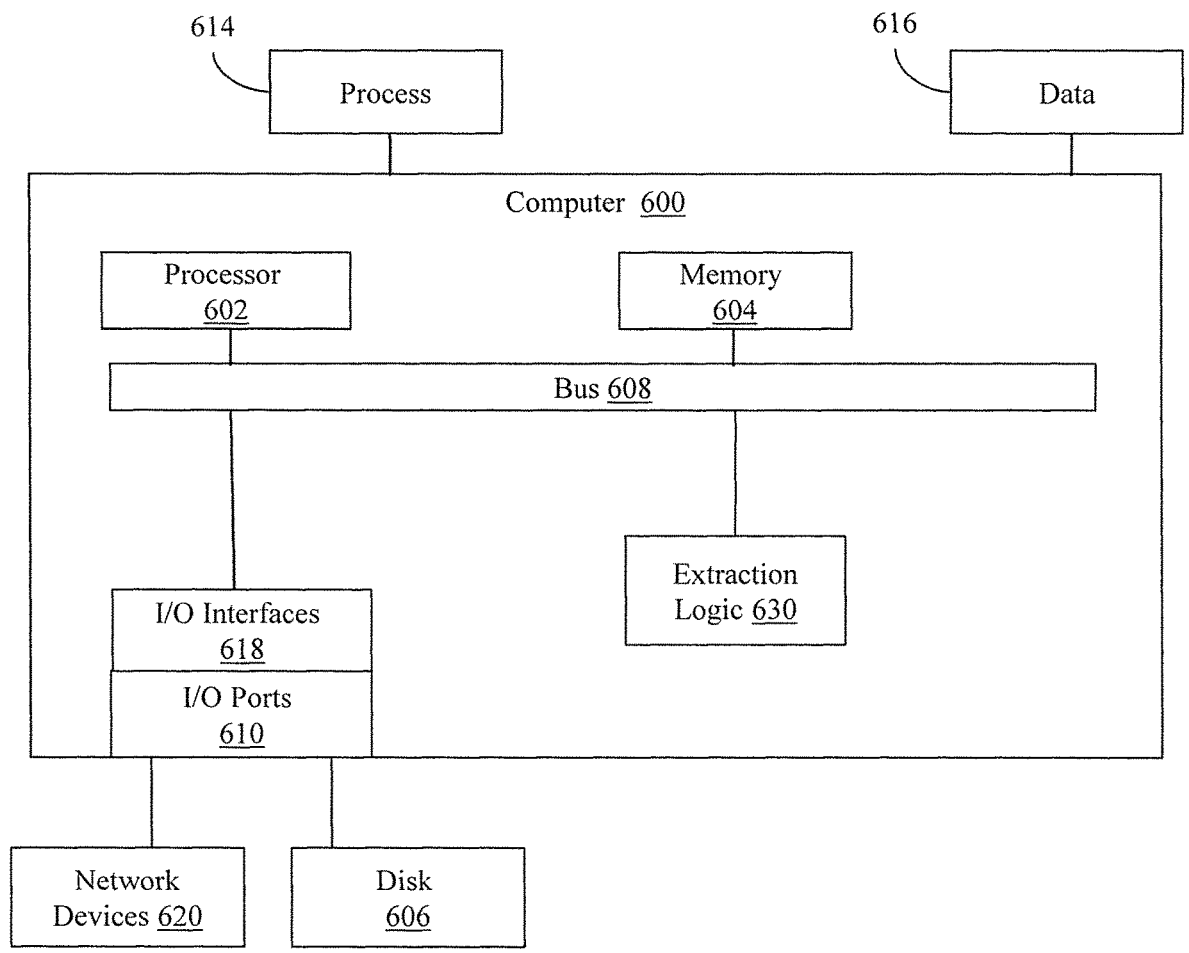
FIG. 6 illustrates an embodiment of a computing system configured with the example systems and methods disclosed.

FIG. 6 illustrates an example computing device that is configured and/or programmed with one or more of the example systems and methods described herein, and/or equivalents. The example computing device may be a computer 600 that includes a processor 602, a memory 604, and input/output ports 610 operably connected by a bus 608. In one example, the computer 600 may include annotation logic 630 configured to facilitate exacting unstructured attributes from description strings similar to computing system 100 of FIG. 1 and associated methods 200-500. In different examples, the extraction logic 630 may be implemented in hardware, a non-transitory computer-readable medium with stored instructions, firmware, and/or combinations thereof. While the extraction logic 630 is illustrated as a hardware component attached to the bus 608, it is to be appreciated that in other embodiments, the extraction logic 630 could be implemented in the processor 602, stored in memory 604, or stored in disk 606.

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to annotate annotation strings according to identified correlations and infer matches between unidentified tokens and the defined attributes. The means may also be implemented as stored computer executable instructions that are presented to computer 600 as data 616 that are temporarily stored in memory 604 and then executed by processor 602.

Logic 630 may also provide means (e.g., hardware, non-transitory computer-readable medium that stores executable instructions, firmware) for performing conditional random fields (CRF) analyses to infer matches, extract attributes according to the inferred matches, and generate electronic data structure that are tables for an electronic inventory database to transform unstructured data into structured attributes stored in the database.

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output (I/O) interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with input/output (I/O) devices via the I/O interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the I/O interfaces 618, and/or the I/O ports 610. Through the network devices 620, the computer 600 may interact with a network. Through the network, the computer 600 may be logically connected to remote computers. Networks with which the computer 600 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium," as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic," as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User," as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer readable medium storing instructions that when executed by one or more processors of a computing device, cause the computing device to at least:
   parse description strings of products to locate tokens, wherein each token initially has a type that is unidentified;
   generate an annotation string for each of the description strings, wherein each character in the annotation string (i) has a corresponding character from a corresponding description string and (ii) is initially set to an undefined value;
   correlate the tokens from each of the description strings with defined attributes of products to identify the type of the token;
   wherein correlating the tokens includes identifying which of the defined attributes match the tokens and mapping each character of the tokens to one of the defined attributes by labeling, in the annotation string, each corresponding character of the token with an identifying label that represents the defined attribute matching the token;
   wherein after the correlating, each character in the description string has a corresponding character in the annotation string that either indicates the identifying label for the token or indicates the token is unidentified;
   generate digraphs for unidentified tokens by iteratively analyzing the description strings and the annotation strings wherein each of the digraphs includes a combination of two neighboring tokens in a selected description string with a first token that is an identified token and a second token that is a neighboring unidentified token;
   wherein the iteratively analyzing includes listing distinct pairs of the digraphs and analyzing a selected identified token and a neighboring unidentified token to determine if the neighboring unidentified token corresponds with a same defined attribute as the selected identified token, and if determined, modifying characters in the annotation string corresponding to the neighboring unidentified token by substituting the identifying label of the identified token into the characters of the annotation string of the neighboring unidentified token; and
   populate the electronic inventory database by extracting the identified tokens from the description strings and inserting the identified tokens into columns of an electronic inventory database as specified by the mappings of the identifying labels of the annotation strings.

2. The non-transitory computer-readable medium of claim 1, wherein the instructions that cause the computing device to populate the electronic inventory database include instructions to cause the computing device to:
   structure the description strings according to the annotation strings by automatically extracting the tokens from the description strings and storing the tokens into the columns of the electronic inventory database as identified by the identifying labels in the annotation strings to populate a description in the electronic inventory database for each of the products,
   wherein the tokens are of varying lengths, wherein the inventory is an inventory of a retail business, and wherein boundary markers separate tokens of the description strings and include spaces or non-alphanumeric characters.

3. The non-transitory computer-readable medium of claim 1, further comprising instructions that cause the computing device to:
   access electronic data that includes the description strings for the products in a category of the inventory by reading the electronic data from a storage medium, and wherein the description strings are unstructured strings of data that do not conform to a defined protocol,
   wherein the defined attributes are associated with the columns of the electronic inventory database and include characteristics of the plurality of products, and
   wherein correlating the tokens initializes the annotation strings to initially identify matches between the tokens and the defined attributes.

4. The non-transitory computer-readable medium of claim 1, wherein the instructions that cause the computing device to correlate the tokens include instructions to cause the computing device to:
   create the annotation strings to track mappings between the tokens and the defined attributes in the electronic inventory database, wherein creating the annotation strings includes generating an electronic data structure and initializing each of the annotation strings within the electronic data structure with the undefined values corresponding to each character in the description strings that specify the values are unidentified tokens, wherein the annotation strings correspond to the description strings in a one-to-one correspondence;
   analyze the description strings to determine token frequencies for distinct ones of the tokens by scanning the descriptions strings for the distinct ones of the tokens;
   list the tokens by filtering the tokens according to the token frequencies for the distinct tokens; and identify the tokens by modifying the annotation strings as specified by a token control input that correlates the tokens with the defined attributes, and wherein modifying the annotation strings includes annotating the identified tokens in the annotation strings according to the identifying labels that are unique identifiers to map the identified tokens with the defined attributes.

5. The non-transitory computer-readable medium of claim 1, wherein the instructions that cause the computing device to correlate the tokens includes include instruction that cause the computing device to:
refine the annotation strings according to the digraphs that associate the identified tokens with the neighboring unidentified tokens to identify which of the defined attributes correspond with the neighboring unidentified tokens.

6. The non-transitory computer-readable medium of claim 1, wherein the instructions that cause the computing device to generate the digraphs includes instructions that cause the computing device to:
analyze the digraphs to determine digraph frequencies for the distinct pairs of the two neighboring tokens;
list the digraphs by filtering the digraphs according to the digraph frequencies;
modify the annotation strings by substituting the identifying label of the identified token into the characters of the annotation string of the neighboring unidentified token according to a digraph control input for each of the digraphs; and
generate a list of unapproved digraphs that indicates which of the digraphs include unidentified tokens after modifying the annotation strings.

7. The non-transitory computer-readable medium of claim 1, wherein the instructions further comprise instructions that cause the computing device to:
generate suggested matches for unidentified tokens by iteratively analyzing the description strings and the annotation strings according to correlations between the defined attributes and the identified tokens;
wherein the instructions that cause the computing device to generate the suggested matches include instructions that cause the computing device to iteratively update the annotation strings with the suggested matches until a number of the unidentified tokens satisfies a defined threshold, wherein the instructions that cause the computing device to generate the suggested matches include instructions that cause the computing device to:
split the description strings and the respective annotation strings into a training set and a test set according to a selected distribution to provide two separate sets of strings as an electronic input, wherein description strings in the test set are assigned test annotation strings that do not include annotations and temporarily replace original annotation strings of the annotation strings for description strings in the test set;
analyze the test set and the defined attributes according to correlations between the tokens of the training set and the defined attributes as modeled from the annotation strings of the training set using a conditional random field model, wherein analyzing the test set newly annotates the test annotation strings for the description strings of the test set to suggest matches between tokens in the description strings of the test set and the defined attributes; and
compare the test annotation strings with the original annotation strings to generate the suggested matches from newly identified tokens in test set.

8. The non-transitory computer-readable medium of claim 7, wherein the instructions that cause the computing device to generate the suggested matches include instructions that cause the device to:
selectively record annotations for the unidentified tokens that have been identified to respective ones of the original annotation strings according to an approval control input;
determine whether the number of the unidentified tokens in the annotation strings satisfies the defined threshold; and
when the defined threshold has not been satisfied, repeating the splitting and analyzing,
wherein generating the suggested matches using the conditional random field model includes inferring the correlations based, at least in part, on lengths of the identified tokens, types of characters comprising the identified tokens, and relative locations of characters in the identified tokens.

9. The non-transitory computer-readable medium of claim 1, further comprising instructions that cause the computer to:
detect errors in the annotation strings by analyzing the annotation strings to verify accuracy of correlations between the annotation strings and the defined attributes for the description strings.

10. The non-transitory computer-readable medium of claim 9, wherein the instructions that cause the computing device to detect the errors include instructions that cause the computing device to:
split the description strings and the respective annotations strings into a training set and a test set to provide two separate sets of strings as an electronic input, wherein description strings in the test set are assigned test annotation strings that do not include annotations and temporarily replace original annotation strings of the annotation strings for respective description strings in the test set;
analyze the test set and the defined attributes according to correlations between the tokens of the training set and the defined attributes as modeled from the annotation strings of the training set using a conditional random field model, wherein analyzing the test set newly annotates the test annotation strings for the description strings of the test set to suggest matches between tokens in the description strings of the test set and the defined attributes;
compare the test annotation strings with the original annotation strings for description strings in the test set to identify errors between the test annotation strings and the original annotation strings; and
selectively correct the original annotation strings for the identified errors according to an error control input.

11. The non-transitory computer-readable medium of claim 7, wherein the instructions that cause the computing device to split the description strings according to the selected distribution includes instructions that cause the computing device to split according to a random split, according to a quality of annotation strings for respective ones of the description strings, and according to a selected one of the defined attributes, and
wherein splitting the description strings for subsequent iterations includes using a different selected distribution.

12. A computing system, comprising:
at least one processor configured to execute instructions from a memory;

at least one memory connected to the at least one processor;
a non-transitory computer readable medium configured with instructions executable by the processor to cause the processor to:
(i) correlate tokens from description strings with defined attributes of products; and
(ii) generate an annotation string for each of the description strings, wherein each character in the annotation string (i) has a corresponding character from a corresponding description string and (ii) is initially set to an undefined value;
wherein correlating the tokens includes identifying which of the defined attributes match the tokens and mapping each character of the tokens to one of the defined attributes by labeling, in the annotation string, each corresponding character of the token with an identifying label that represents the defined attribute matching the token;
wherein after the correlating, each character in the description string has a corresponding character in the annotation string that either indicates the identifying label for the token or indicates the token is unidentified;
(iii) generate digraphs for unidentified tokens by iteratively analyzing the description strings and the annotation strings wherein each of the digraphs includes a combination of two neighboring tokens in a selected description string with a first token that is an identified token and a second token that is a neighboring unidentified token;
wherein the iteratively analyzing includes listing distinct pairs of the digraphs and analyzing a selected identified token and a neighboring unidentified token to determine if the neighboring unidentified token corresponds with a same defined attribute as the selected identified token, and if determined, modifying characters in the annotation string corresponding to the neighboring unidentified token by substituting the identifying label of the identified token into the characters of the annotation string of the neighboring unidentified token; and
(iv) populate the electronic inventory database by extracting the tokens from the description strings and inserting the tokens into columns of records of an electronic inventory database as specified by mappings of the annotation strings.

13. The computing system of claim 12, wherein the instructions are further configured to populate the database by structuring the description strings according to the annotation strings including automatically extracting the tokens from the description strings and storing the tokens into the columns of the electronic inventory database as identified by the identifying labels in the annotation strings to populate a description in the electronic inventory database for each of the products,
wherein the tokens are of varying lengths, wherein the inventory is an inventory of a retail business, wherein boundary markers separate tokens of the description strings and include spaces or non-alphanumeric characters.

14. The computing system of claim 12, further comprising:
a communication module stored in a non-transitory computer readable medium and configured with instructions for receiving and accessing electronic data that includes the description strings for the products in a category of the inventory by reading the electronic data from a storage medium, and wherein the description strings are unstructured strings of data that do not conform to a defined protocol,
wherein the defined attributes are associated with the columns of the electronic inventory database and include characteristics of the plurality of products, and
wherein the correlation module is configured with instructions for correlating the tokens to initialize the annotation strings to initially identify matches between the tokens and the defined attributes.

15. The computing system of claim 12, further comprising:
an inference module stored in the non-transitory computer readable medium and configured with instructions executable by the processor to cause the processor to: generate suggested matches for unidentified tokens by iteratively analyzing the description strings and the annotation strings according to correlations between the defined attributes and the identified tokens as defined by a statistical model that is a function of the correlations, wherein generating the suggested matches includes updating the annotation strings with the suggested matches to map the unidentified tokens with the defined attributes;
wherein the inference module is further configured with instructions for detecting errors in the annotation strings by analyzing the annotation strings to verify accuracy of correlations between the annotation strings and the defined attributes for the description strings.

16. The computing system of claim 12, wherein the inference module is configured with instructions for:
splitting the description strings and the respective annotation strings into a training set and a test set according to a selected distribution to provide two separate sets of strings as an electronic input, wherein description strings in the test set are assigned test annotation strings that do not include annotations and temporarily replace original annotation strings of the annotation strings for description strings in the test set;
analyzing the test set and the defined attributes according to correlations between the tokens of the training set and the defined attributes as modeled from the annotation strings of the training set using a conditional random field model, wherein analyzing the test set newly annotates the test annotation strings for the description strings of the test set to suggest matches between tokens in the description strings of the test set and the defined attributes; and
comparing the test annotation strings with the original annotation strings to generate the suggested matches from newly identified tokens in test set.

17. The computing system of claim 12, wherein the non-transitory computer readable medium is further configured with instructions for:
creating the annotation strings to track mappings between the tokens and the defined attributes in the electronic inventory database, wherein creating the annotation strings includes generating an electronic data structure and initializing each of the annotation strings within the electronic data structure with the undefined values corresponding to each character in the description strings that specify the values are unidentified tokens, wherein the annotation strings correspond to the description strings in a one-to-one correspondence;
analyzing the description strings to determine token frequencies for distinct ones of the tokens by scanning the descriptions strings for the distinct ones of the tokens;

listing the tokens by filtering the tokens according to the token frequencies for the distinct tokens; and identifying the tokens by modifying the annotation strings as specified by a token control input that correlates the tokens with the defined attributes, and wherein modifying the annotation strings includes annotating the identified tokens in the annotation strings according to the identifying labels that are unique identifiers to map the identified tokens with the defined attributes.

18. The computing system of claim 12, wherein the non-transitory computer readable medium is further configured with instructions for:

refining the annotation strings according to digraphs that associate the identified tokens with neighboring unidentified tokens to identify which of the defined attributes correspond with the neighboring unidentified tokens, wherein each of the digraphs includes two neighboring tokens from a respective one of the description strings.

19. The computing system of claim 12, wherein the non-transitory computer readable medium is further configured with instructions for:

analyzing the digraphs to determine digraph frequencies for the distinct pairs of the two neighboring tokens;

listing the digraphs by filtering the digraphs according to the digraph frequencies;

modifying the annotation strings by substituting the identifying label of the identified token into the characters of the annotation string of the neighboring unidentified token according to a digraph control input for each of the digraphs; and generating a list of unapproved digraphs that indicates which of the digraphs include unidentified tokens after modifying the annotation strings.

20. A computer-implemented method for extracting attributes from description strings, the method comprising:

receiving, over a communications network from a remote device, a stream of electronic data that includes the description strings, wherein the description strings are unstructured combinations of alphanumeric characters describing attributes of products in an inventory;

generating an annotation string for each of the description strings, wherein each character in the annotation string (i) has a corresponding character from a corresponding description string and (ii) is initially set to an undefined value;

correlating tokens from each of the description strings with defined attributes of products in an electronic inventory database by identifying which of the defined attributes match the tokens to link the tokens to one of the defined attributes by labeling, in the annotation string, each corresponding character of the token with an identifying label that represents the defined attribute matching the token;

wherein after the correlating, each character in the description string has a corresponding character in the annotation string that either indicates the identifying label for the token or indicates the token is unidentified;

generating digraphs for unidentified tokens by iteratively analyzing the description strings and the annotation strings wherein each of the digraphs includes a combination of two neighboring tokens in a selected description string with a first token that is an identified token and a second token that is a neighboring unidentified token;

wherein the iteratively analyzing includes listing distinct pairs of the digraphs and analyzing a selected identified token and a neighboring unidentified token from a selected description string to determine if the neighboring unidentified token corresponds with a same defined attribute as the selected identified token, and if determined, updating characters in the annotation string corresponding to the neighboring unidentified token by substituting the identifying label of the identified token into the characters of the annotation string of the neighboring unidentified token; and populating the database using the identified tokens from the description strings according to the annotation strings by automatically storing the tokens from the description strings into columns of an electronic inventory database as identified by the annotation strings.

* * * * *

UNITED STATES PATENT AND TRADEMARK OFFICE
CERTIFICATE OF CORRECTION

PATENT NO. : 10,628,403 B2
APPLICATION NO. : 15/007381
DATED : April 21, 2020
INVENTOR(S) : Wu et al.

Page 1 of 1

It is certified that error appears in the above-identified patent and that said Letters Patent is hereby corrected as shown below:

In the Specification

In Column 4, Line 50, delete "to a" and insert -- to --, therefor.

In Column 11, Line 33, delete "Yopiait" and insert -- Yoplait --, therefor.

In the Claims

In Column 19, Line 38, in Claim 1, delete "computer readable" and insert -- computer-readable --, therefor.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*